United States Patent [19]

Paar

[11] Patent Number: 5,132,341
[45] Date of Patent: Jul. 21, 1992

[54] CATIONIC PAINT BINDERS FOR FORMULATING PIGMENT PASTES FOR CATHODICALLY DEPOSITABLE ELECTROCOATING PAINTS BASED ON B-HYDROXYALKYLAMINES, TITANIUM COMPOUNDS AND FORMALDEHYDE

[75] Inventor: Willibald Paar, Graz, Austria

[73] Assignee: Vianova Kunstharz, A.G., Graz, Austria

[21] Appl. No.: 654,015

[22] Filed: Feb. 12, 1991

[30] Foreign Application Priority Data

Feb. 12, 1990 [AT] Austria .................................. 308/90

[51] Int. Cl.$^5$ ...................... C08G 59/14; C08L 63/00; C09D 5/44

[52] U.S. Cl. ................................ 523/404; 523/414; 523/415; 523/417; 523/421; 525/523; 525/526; 525/528; 525/531; 525/533; 528/92; 528/107

[58] Field of Search ............... 523/404, 414, 415, 417, 523/421; 525/523, 526, 528, 531, 533; 528/92, 107

[56] References Cited

U.S. PATENT DOCUMENTS

| | | | |
|---|---|---|---|
| 3,812,214 | 5/1974 | Markovitz | 525/507 |
| 4,384,946 | 5/1983 | Patzchke et al. | 523/414 |
| 4,397,990 | 8/1983 | Kooymans et al. | 525/167 |
| 4,788,234 | 11/1988 | Schipfer et al. | 528/92 |
| 4,837,291 | 1/1989 | Paar | 525/504 |
| 4,973,613 | 11/1990 | Paar | 528/92 |

*Primary Examiner*—John C. Bleutge
*Assistant Examiner*—Frederick Krass
*Attorney, Agent, or Firm*—Breiner & Breiner

[57] ABSTRACT

A process for the production of cationic paint binders which are particularly suitable for formulating pigment pastes for cathodically depositable electrocoating paints is described. The paint binders produced according to the invention are modified epoxy resin-amine adducts which contain organically-chemically bonded titanium. The cured paint films provide excellent corrosion protection on non-pretreated sheet steel even in the absence of lead-containing compounds and/or lead pigments.

9 Claims, No Drawings

CATIONIC PAINT BINDERS FOR FORMULATING PIGMENT PASTES FOR CATHODICALLY DEPOSITABLE ELECTROCOATING PAINTS BASED ON B-HYDROXYALKYLAMINES, TITANIUM COMPOUNDS AND FORMALDEHYDE

FIELD OF INVENTION

The invention relates to a process for the production of cationic paint binders which are particularly suitable for formulating pigment pastes for cathodically depositable electrocoating paints and to the binders produced. Cured paint films utilizing the binders provide excellent corrosion protection on non-pretreated sheet steel even in the absence of lead-containing compounds and/or lead pigments.

BACKGROUND OF INVENTION

In the paint industry it is generally customary in the production of pigmented paints to grind the pigments in some of the binder to be used in formulating the paints or in special binders (paste resins) which are compatible with the paint components. To achieve adequate corrosion resistance on non-pretreated sheet steel, it has been necessary to use lead compounds and/or lead pigments which in the majority of cases are incorporated into these pigment resins together with other pigments and extenders.

However, all lead compounds currently used for such purpose have considerable drawbacks for cathodically depositable electrocoating paints. The lead compounds used as solids (lead oxide and basic lead silicate) must first be dissolved in the paint. Consequently, the paints require longer homogenization times before the full effectiveness of the lead salt as catalyst is attained. The water-soluble salts formed in the process—as well as other water-soluble salts added directly to the paint—are located to a large extent not in the resin micelle, but in the aqueous phase of the paint. They are washed out of the film during electrodeposition by the endosmosis effect occurring in the film and cause water removal from the film, or they are deposited on the substrate in the form of a metallic precipitate. In addition, dissolved salts can be partly removed from the bath by the dialysis equipment used in the electrocoating plant and are possibly returned to the bath in an uncontrolled manner during the rinsing operations.

The water-insoluble lead salts of longer-chain fatty acids are soluble in the resin and, therefore, remain to a considerable extent in the resin micelle. However, titratable amounts of water-insoluble fatty acids which interfere with the deposition characteristics of the paint film and the bath operation during the electrocoating process are formed by hydrolysis.

Furthermore, the use of lead compounds in paints is being increasingly rejected by the industry because of the toxicity of these compounds and the waste disposal problems associated with them. On the other hand, however, adequate corrosion protection of bare metal represents an essential requirement of the users of cathodically deposited electrocoating paints, particularly in the automotive industry.

EP 336,283 A2, corresponding to commonly assigned U.S. Ser. No. 334,526 filed Apr. 7, 1989, describes basic organotitanate compounds as additives for cathodically depositable paint systems, by means of which the corrosion protection of bare metals is significantly improved. This method requires, however, the preparation and storage of an additional paint component. Pigment grinding in such additives is not possible owing to the marked structural viscosity of these compounds.

U.S. Pat. No. 4,973,613, commonly assigned, corresponding to EP 347,785 A2, relates to cathodically depositable electrocoating paints which comprise combinations of cationic film-forming resins with organic titanium compounds, the latter being obtained by reacting a tetraalkyl orthotitanate and/or a titanium acetylacetonate with NH-functional β-hydroxyalkylamines, followed by reaction with formaldehyde.

It has now been found that it is possible to produce cationic paint binders for formulating pigment pastes for cathodically depositable electrocoating paints on the principle of the reaction scheme outlined in U.S. Pat. No. 4,973,613, if epoxy resin-amine adducts with a specific structure are used.

SUMMARY OF INVENTION

The invention relates to a process for the production of cationic paint binders, based on modified epoxy resin-amine adducts, which are water thinnable after partial or complete neutralization and are particularly suitable for formulating pigment pastes for cathodically depositable electrocoating paints, characterized in that 1.0 mol of a diepoxide compound having an epoxide equivalent weight of 150 to 500 is reacted at 70° to 120° C. with 0.5 to 1.5 mol, preferably 0.8 to 1.2 mol, of a secondary monoamine and/or a monocarboxylic acid and/or a monophenol until the corresponding epoxide group equivalents are reacted, followed by reaction of this intermediate at 60 to 80.C with 0.5 to 1.5 mol, preferably 0.8 to 1.2 mol, of a primary-tertiary alkylenediamine to form a secondary β-hydroxyalkylamine compound which is free from epoxide groups, followed by reaction of this compound at 60 to 120° C. with a tetra-alkyl orthotitanate and/or a titanium acetylacetonate and subsequently, at 80° to 100° C., with formaldehyde, while removing the alcohol and/or acetylacetone formed, with the proviso that the titanium content of the binder, calculated as metal and based on resin solids, is 1.0 to 5.0% by weight, preferably 2.0 to 4.0% by weight.

The invention further relates to the paint binders produced by the process and to the use of the paint binder produced according to the invention in formulating pigment pastes for lead-free, cathodically depositable electrocoating paints.

The use of the paste resins produced according to the invention has the advantage of having the catalytically active titanium being integrated into the binder system.

In the preparation of the epoxy resin-amine adducts, diepoxide compounds having an epoxide equivalent weight of 150 to 500 are used. Commercial epoxy resins based on bisphenol A and bisphenol F or the corresponding diepoxides based on aliphatic compounds such as polypropyleneglycol as well as mixtures of these products are preferred.

Suitable secondary monoamines are alkylamines, such as dibutylamines and their homologues. Suitable monocarboxylic acids are preferably those comprising a higher aliphatic radical, such as isononanoic acid or linseed oil fatty acid. When monophenols are selected, a phenol having an aliphatic radical, such as in nonylphenol, is preferred.

N,N'-dimethylaminopropylamine and homologous compounds are preferably used as the primary-tertiary alkylenediamines.

Commercially available tetra-alkyl orthotitanates or titanium acetonylacetonates of the formula Ti(O-alkyl)$_n$-(acetylacetonate)$_2$ (n=0 or 2) are utilized as the titanium compound. Preferred titanium compounds are those in which the alkyl radical is a butyl radical.

To prepare the binder, the diepoxide compound is first reacted at 70° to 120° C. with the secondary monoamine and/or the monocarboxylic acid and/or the monophenol until the corresponding epoxide group equivalents are reacted. The primary-tertiary alkylenediamine is then added on at 60°-80° C. At times it may be desirable to carry out the reaction in the presence of a suitable solvent. The further reaction with the tetra-alkyl orthotitanate or the titanium acetylacetonate is carried out at 60° to 120° C., the resultant alcohol and/or acetylacetone being split off. Formaldehyde, preferably as paraformaldehyde, is then added and the reaction mixture is kept at 80° to 100° C. until homogenization is complete. Finally the alcohol or acetylacetone formed in the reaction with the N-methylol group is removed.

To prepare the epoxy resin-amine adduct, 1.0 mol of the diepoxide compound, i.e., 2.0 mol of epoxide groups, is reacted with 0.5 to 1.5 mol, preferably 0.8 to 1.2 mol, of the monofunctional compound and with 0.5 to 1.5 mol, preferably 0.8 to 1.2 mol, of the diamine to form a secondary $\beta$-hydroxyalkylamine compound which is free from epoxide groups.

The amount of the titanium compound to be added is such that the binder has a titanium content of 1.0 to 5.0% by weight, calculated as the metal and based on resin solids. The preferred range lies between 2.0 and 4.0% by weight.

The binders prepared according to the invention are mixed in a known manner with pigments, extenders, colorants and, if desired, other paint additives to form pigment pastes. For the preparation of these pigment pastes, the conventional mixing and grinding equipment, such as dissolvers, sand mills, bead mills or ball mills or roller grinders, are used.

The pigment pastes are then mixed with the clear varnish component, giving rise to a paint having the desired pigment/binder ratio. The pigment pastes produced from the paste resins prepared according to the invention are particularly suitable, because of their high pigment content, for the 2-component top-up process during operation of cationic electrocoating tanks as well as for the production of paint formulations with a low proportion of organic auxiliary solvents.

To achieve satisfactory results in practice the paints must have a titanium content of 0.03 to 3% by weight, preferably 0.1 to 1.0% by weight, calculated as the metal and based on the total paint binder as resin solids. If desired, the proportion of titanium derived from the pigment paste can be further augmented in the electrocoating paint by minor additions of suitable titanium compounds, for example those described in EP 336,283 A2.

DETAILED DESCRIPTION AND PRESENTLY PREFERRED EMBODIMENTS

The following examples illustrate the invention without limiting its scope. All parts and percentages are by weight, unless stated otherwise.

Example 1 (Paste Resin 1=PR1):

380 parts of a bisphenol A diglycidylether (epoxide equivalent weight 190, corresponding to 2.0 mol of free epoxide groups) are reacted in a reaction vessel at 110° C. with 242 parts (1.1 mol) of nonylphenol in a known manner to an epoxide equivalent weight of 190. The reaction mixture is diluted with 180 parts of ethyleneglycol monobutylether and treated with 117 parts (0.9 mol) of diethylaminopropylamine. It is then cooled to 70° C. and kept at such temperature until all epoxide groups are reacted. The intermediate produced is reacted at 100° C. with 170 parts (0.5 mol) of tetrabutyl titanate, 74 parts (1.0 mol) of butanol being split off and removed. 30 parts (0.9 mol) of 91% paraformaldehyde are added, and 67 parts (0.9 mol) of butanol are again removed by distillation under reduced pressure. The resultant product has a titanium content of 3.1% (metal), based on binder solids, and is diluted with methoxypropanol to a solids content of 75%.

Example 2 (Paste Resin 2=PR2):

In a manner similar to that described in Example 1, a paste resin with a titanium content of 2.7% by weight is prepared from 640 parts of polypropyleneglycol diglycidylether (epoxide equivalent weight 320, equivalent to 2.0 mol of epoxide groups), 127 parts of dibutylamine (1.0 mol), 102 parts of dimethylaminopropylamine (1.0 mol), 170 parts of titanium-(O-butyl)(acetylacetonate)$_2$ (0.5 mol), and 33 parts (1.0 mol) of 91% paraformaldehyde. For further use, this product is diluted with methoxypropanol to a solids content of 80%.

Example 3 (Paste Resin 3=PR3)

A paste resin with a titanium content of 3.6% by weight is prepared as described in Example 1 from 380 parts of bisphenol A diglycidylether (epoxide equivalent weight 190, corresponding to 2 mol of epoxide groups), 151 parts of isononanoic acid (0.9 mol), 143 parts of diethylaminopropylamine (1.1 mol), 187 parts of tetrabutyl titanate (0.55 mol), and 36 parts of 91% paraformaldehyde (1.1 mol). The dilution is carried out with ethoxypropanol to give a solids content of 70%.

Testing Of The Binders Prepared According To The Invention As Pigment Paste Resins In Combination With Cathodically Depositable Binders The binders are treated with organic auxiliary solvents or with a neutralization agent in amounts listed in Table 1 and mixed to give a homogeneous mixture. The grinding of the pigments with such resin solution is carried out in a conventional manner in a bead mill. The incorporation of the pigments may also be carried out in aqueous phase (paste D).

The pigment pastes obtained in such manner are mixed with 20% aqueous clear varnishes of various cathodically depositable electrocoating paint binders (ECP binders) and homogenized for 24 hours. The type and amount of the paint components are summarized in Table 2. The data for the binder and pigment paste refer to the solids content.

Table 2 also comprises the conditions of deposition (voltage in volts at a deposition time of 90 seconds at 30° C.) on non-pretreated (I) and zinc-phosphated sheet steel (II). Table 2 also sets forth the results of the salt spray test according to ASTM B117-73 (on non-pretreated sheet steel), and the corrosion alternating test according to VDA 621-415 (on phosphated sheet steel).

The preparation of the cathodically depositable electrocoating paint binders B1-B4 referred to in Table 2 are described following Table 2.

of 91% paraformaldehyde (1.5 mol) are added, and the reaction is allowed to proceed at 60° C. until a free formaldehyde content of 0.5 to 1% is reached. The solids content of the resultant binder is 77%.

TABLE 1

| Paste | Paste Resin (solid) | Additional Auxiliary Solvent* | Neutralization (xx) | Carbon Black | Pigments Al-Silicate Pigment | Titanium Dioxide | Pigment/ Binder Ratio | Solids % by Weight |
|---|---|---|---|---|---|---|---|---|
| A | 100 (PR1) | BG | 60 FA | 16 | 184 | — | 2:1 | 60 |
| B | 100 (PR1) | BG | 70 AA | 3 | — | 297 | 3:1 | 65 |
| C | 100 (PR2) | MP | 50 FA | 10 | 60 | 30 | 1:1 | 63 |
| D | 100 (PR2) | W | 100 FA | 32 | 80 | 288 | 4:1 | 54 |
| E | 100 (PR3) | MP | 60 AA | 16 | 184 | — | 2:1 | 60 |
| F | 100 (PR3) | BG | 60 AA | 2 | — | 198 | 2:1 | 62 |
| G | 100 (PR3) | MP | 50 FA | 10 | 60 | 30 | 1:1 | 58 |

*to attain the stated final solids content (xx) millimol per 100 g of resin solids
BG ... ethyleneglycol monobutylether
MP ... methoxypropanol
FA ... formic acid
AA ... acetic acid
W ... water

TABLE 2

| | Paint | | | | | | | | | | | |
|---|---|---|---|---|---|---|---|---|---|---|---|---|
| | 1 | 2 | 3 | 4 | 5 | 6 | 7 | 8 | 9 | 10 | C1 | C2 |
| ECP Binders | B1 | B1 | B2 | B2 | B2 | B3 | B3 | B3 | B4 | B4 | B2 | B3 |
| Parts | 80 | 70 | 80 | 85 | 80 | 60 | 90 | 70 | 70 | 75 | 100 | 100 |
| Neutralization Formic Acid millimol/100 g | 40 | 45 | 40 | 40 | 45 | 35 | 40 | 40 | 60 | 55 | 45 | 45 |
| Pigment Paste | A | B | E | B | F | G | D | B | C | F | — | — |
| Parts | 60 | 90 | 60 | 60 | 60 | 80 | 50 | 90 | 60 | 75 | — | — |
| Pigment/Binder Ratio | 0.4:1 | 0.6:1 | 0.4:1 | 0.45:1 | 0.4:1 | 0.4:1 | 0.4:1 | 0.6:1 | 0.3:1 | 0.5:1 | 0.4:1 | 0.3:1 |
| Ti Content % by wt. Resin Solids | 0.62 | 0.93 | 0.74 | 0.47 | 0.74 | 1.48 | 0.27 | 0.93 | 0.81 | 0.93 | — | — |
| Paint Solids Content % by wt. | 20 | 17 | 18 | 18 | 18 | 22 | 19 | 20 | 20 | 18 | 18 | 18 |
| Deposition Voltage (V) | | | | | | | | | | | | |
| I | 200 | 180 | 210 | 190 | 200 | 240 | 220 | 200 | 180 | 220 | 220 | 200 |
| II | 260 | 240 | 270 | 250 | 280 | 300 | 280 | 240 | 250 | 270 | 280 | 280 |
| Salt Spray Test[1] ASTM B-117-73 | 1.0 | 1.2 | 0.9 | 1.8 | 0.8 | 0.5 | 1.7 | 1.0 | 0.9 | 1.2 | 9.0 | 2.3 |
| VDA Characteristic[2] | 2.1 | 1.7 | 1.5 | 1.6 | 1.8 | 0.9 | 1.8 | 1.2 | 2.0 | 2.0 | 4.2 | 2.8 |

[1] Corrosion at cross-hatch in mm after 240 hours (both sides of hatch)
[2] mm of undermigration after 10 cycles (both sides of hatch)

Preparation Of The ECP Binders Used In The Examples

Binder B1

700 parts of B 180, which is a liquid polybutadiene oil having about 75% 1,4-cis- and about 24% 1,4-trans-, and having about 1% of vinyl double bonds, a molecular weight of about 1500±15% and an iodine value about 450 g/100 g; are reacted at 200° C. with 100 parts of maleic anhydride in the presence of 0.5 parts of diphenylparaphenylenediamine (inhibitor) until the anhydride has reacted completely. 130 parts of 2-ethylhexanol are added to the reaction mixture cooled to 100° C., and the mixture is esterified at 120° C. until the theoretical acid value of the semiester is reached.

110 parts of the semiester (corresponding to about 0.12 COOH groups) are reacted at 120° C. with 212 parts of a bisphenol A and epichlorohydrin diepoxy resin (epoxide equivalent weight about 190) in an 80% solution in diethyleneglycol dimethylether until an acid value of substantiallyy zero is reached. After the addition of 108 parts of diethyleneglycol dimethylether, 59 parts of diethylaminopropylamine (0.45 mol) and 59 parts of 2-ethylhexylamine (0.45 mol), the reaction mixture is reacted at 65 to 70° C. until an epoxide value of substantially zero is reached. When this value is reached, 114 parts of bisphenol A (0.5 mol) and 50 parts Binder B2

220 parts of nonylphenol (1 mol) are heated in a reaction vessel with 130 parts of diethylaminopropylamine (1 mol) and 100 parts of toluene to 75° C. and 33 parts of 91% paraformaldehyde (1 mol) are then added to the mixture with gentle cooling. The temperature is slowly raised until a continuous azeotropic distillation ensues. After separation of 21 parts of water of reaction, the toluene is distilled off in vacuo and the product is dissolved in 167 parts of diethyleneglycol dimethylether. The solution obtained is treated at 30 to 40° C. with 304 parts (1.0 mol) of a toluylene diisocyanate half-blocked with 2-ethylhexanol with cooling, and the temperature is kept at 40° C. for 1.5 hours until the NCO-value is substantially zero.

Subsequently, 475 parts of an epoxy resin based on bisphenol A and epichlorohydrin (epoxide equivalent weight 475) are dissolved in 200 parts of propyleneglycol monomethylether and 835 parts of the intermediate prepared above are added. The reaction is allowed to react at 95 to 100° C. to an epoxide value of substantially zero. The resultant solids content is 70%.

Binder B3

500 parts of an epoxy resin based on bisphenol A and epichlorohydrin (epoxide equivalent weight about 500), dissolved in 214 parts of propyleneglycol monomethylether, are reacted at 110° C. with 83 parts of a semiester obtained from phthalic anhydride and 2-ethylhexanol in the presence of 0.5 parts of triethylamine as catalyst to an acid value of less than 3 mg KOH/g. 120 parts of an NH-functional oxazolidine, obtained from the reaction of aminoethylethanolamine, 2-ethylhexylacrylate and formaldehyde, are then added together with 26 parts of diethylaminopropylamine. The reaction mixture is allowed to react at 80° C. to an epoxide value of substantially zero, and is diluted with 200 parts of propyleneglycol monomethylether. 70 parts (resin solids) of this oxazolidine-modified epoxy resinamine adduct are homogenized for 30 minutes at 50° C. with 30 parts (resin solids) of the crosslinking component described below. The solids content of the binder mixture is 66%.

The crosslinking component is prepared by reacting 1 mol of a toluylene diisocyanate half-blocked with 2-ethylhexanol with 0.33 mol of triethanolamine. The reaction is carried out in a 70% solution in diethyleneglycol dimethylether at 50 to 60° C. until the isocyanate groups have reacted completely.

Binder B4

1000 parts of an epoxy resin based on bisphenol A and epichlorohydrin (epoxide equivalent weight about 500) are dissolved in 492 parts of ethylglycol acetate in a reaction vessel fitted with a stirrer, thermometer, and reflux condenser at 60° to 70° C. 0.2 parts of hydroquinone and 144 parts of acrylic acid are added, and the temperature is raised to 100°-110° C. The reaction mixture is allowed to proceed at this temperature until an acid value of less than 5 mg KOH/g is reached. The reaction product is subsequently treated at 60° to 70° C. with 652 parts of a monoisocyanate obtained from 1 mol of toluylene diisocyanate and 1 mol of diethylethanolamine (70% solution in methyl isobutyl ketone), and the reaction is allowed to proceed until an NCO-value of substantially zero is reached. The resultant solids content is 70%.

For comparison examples (C1 and C2 of Table 2), the binders B2 and B3 are pigmented in their solvent-containing form using the following pigment composition:

For B2: 1 part of carbon black and 39 parts of titanium dioxide are added to 100 parts of resin solids, and the mixture is homogenized in a suitable grinding unit.

For B3: The pigmentation is carried out by adding 2 parts of basic lead silicate, 2 parts of carbon black, and 26 parts of titanium dioxide to 100 parts of resin solids.

As will be apparent to one skilled in the art, various modifications can be made within the scope of the aforesaid description. Such modifications being within the ability of one skilled in the art form a part of the present invention and are embraced by the appended claims.

It is claimed:

1. Process for the production of cationic paint binders, based on modified epoxy resin-amine adducts, which are water-thinnable after partial or complete neutralization wherein 1.0 mol of a diepoxide compound having an epoxide equivalent weight of 150 to 500 is reacted at 70° to 120° C. with 0.5 to 1.5 mol of a member of the group consisting of a secondary monoamine, a monocarboxylic acid, a monophenol, and mixtures thereof until the corresponding epoxide group equivalents are reacted, followed by a reaction of such intermediate at 60° to 80° C. with 0.5 to 1.5 mol of a primary-tertiary alkylenediamine to form a secondary β-hydroxyalkylamine compound which is free from epoxide groups, followed by a reaction of such compound at 60° to 120° C. with at least one of a tetra-alkyl orthotitanate or a titanium acetylacetonate, and subsequently at 80° to 100° C. with formaldehyde, the resultant alcohol and/or acetylacetone being removed, with the proviso that the titanium content of the binder, calculated as metal and based on resin solids, is from about 1.0 to 5.0% by weight.

2. The process according to claim 1 wherein said member of the group consisting of secondary monoamine, monocarboxylic acid, and monophenol is present in an amount of from 0.8 to 1.2 mol.

3. The process according to claim 1 or 2 wherein said primary-tertiary alkylenediamine is present in an amount of from 0.8 to 1.2 mol.

4. The process according to any one of claims 1 wherein the metal based on resin solids is present at from 2.0 to 4.0% by weight.

5. The process according to any one of claim 1 wherein the titanium compound is tetrabutyl titanate.

6. The process according to any one of claim 1 wherein the titanium compound is titanium (O-butyl)$_2$-(acetylacetonate)$_2$.

7. The paint binder produced by the process according to claims 1.

8. Cathodically depositable electrocoating paints containing 0.03 to 3% by weight of titanium (calculated as metal and based on the total paint binder as resin solids) which is either totally or to a predominant extent bonded to a binder producted by the process according to claim 1.

9. The cathodically depositable electrocoating paints of claim 8 wherein said paints contain 0.1 to 1% by weight titanium.

* * * * *